April 10, 1928.

B. W. CANRIGHT

COFFEE MAKING APPARATUS

Filed Dec. 19, 1927

Inventor
BRUCE W. CANRIGHT

ATTORNEYS

April 10, 1928.  B. W. CANRIGHT  1,665,728
COFFEE MAKING APPARATUS
Filed Dec. 19, 1927   5 Sheets-Sheet 4

Inventor
BRUCE W. CANRIGHT
By Paul, Paul & Moore
ATTORNEYS.

Patented Apr. 10, 1928.

1,665,728

UNITED STATES PATENT OFFICE.

BRUCE W. CANRIGHT, OF ST. PAUL, MINNESOTA, ASSIGNOR OF ONE-HALF TO IRA E. MEAGHER, OF MINNEAPOLIS, MINNESOTA.

COFFEE-MAKING APPARATUS.

Application filed December 19, 1927. Serial No. 241,124.

This invention relates to coffee making apparatus.

One of the main objects is to eliminate the use of screens or strainers, and, therefore, to produce a device which does not operate on the percolation principle. The use of strainers whether the coffee is coarsely or finely ground results in clogging of the screens. Moreover, by percolation certain undesirable substances of the coffee bean go into solution. The present machine substantially eliminates the use of strainers except for draining purposes, to permit a draining of the potable portion of the coffee from the grounds before dumping the grounds.

Other objects of the invention are to provide a machine which is substantially noiseless in operation and in which no pumps are used; to provide a device wherein no steam can reach the dry coffee supply to moisten it and cause that clogging which interferes with its flow; to provide a general simplification of mechanism wherein the operations are obtained, for example by a single element as gear and cam; to provide a coffee supply hopper mounted upon a removable mechanism cover, and to removably mount the hopper in such cover; to arrange the hopper so that when it is removed access can be had to the mechanism for oiling or adjusting without removal of the cover; to provide a construction whereby the coffee making portion of the mechanism can be removed as a unit; to provide mechanism operable by a float in the coffee dispensing chamber, to stop operation of the machine when the chamber is full, and to provide means whereby the coffee chamber is removable and whereby the float can be adjusted and held in a position to permit removal of the made coffee storage or dispensing tank; to provide an agitator or mixer in the steeping chamber operable by the same mechanism which controls coffee making; and to provide an agitator in the receiving chamber for the dry coffee, to prevent clogging and to operate this agitator by a portion of the same mechanism which performs the coffee making operation.

Features of the invention include the simple arrangement of the parts; the simple construction of the parts per se; the use of only two chambers, respectively for extracting the coffee essence, and for draining after extraction; the construction allowing removal of these two chambers as a unit, including a portion of the operating mechanism; the arrangement for causing automatic closing of the bottom of the drain chamber when the same is moved to receiving position and for automatically releasing the same to drop, when moved from receiving position; the arrangement for permitting removal of the coffee dispensing receptacle, as well as the means for preventing accidental removal; the arrangement of the float and device for permitting its removal so that the receptacle can be removed; the arrangement of the dry coffee supply hopper, removably in a casing which acts as a cover for the synchronizing mechanism; and generally to all details of arrangement and construction of the parts.

Advantages of the invention will be set forth in the description of the drawings forming a part of this application, and in said drawings

A suitable casing and support for the device is generally indicated at 1, and the casing is suitably supported on legs 2, preferably with its bottom spaced from the floor to permit arrangement of a warming burner 5 beneath a coffee dispensing compartment. The casing is divided vertically to provide, in this instance, at one side, a chamber within which is removably contained certain portions of the coffee handling or making mechanism, including extraction, draining and dumping elements. The general contour of this chamber is best shown by dotted lines in Figure 9 and comprises rear and side walls 7 and 8. The chamber is closed at the front by a door 10, the hinges or securing device of which are not shown.

Figure 1:
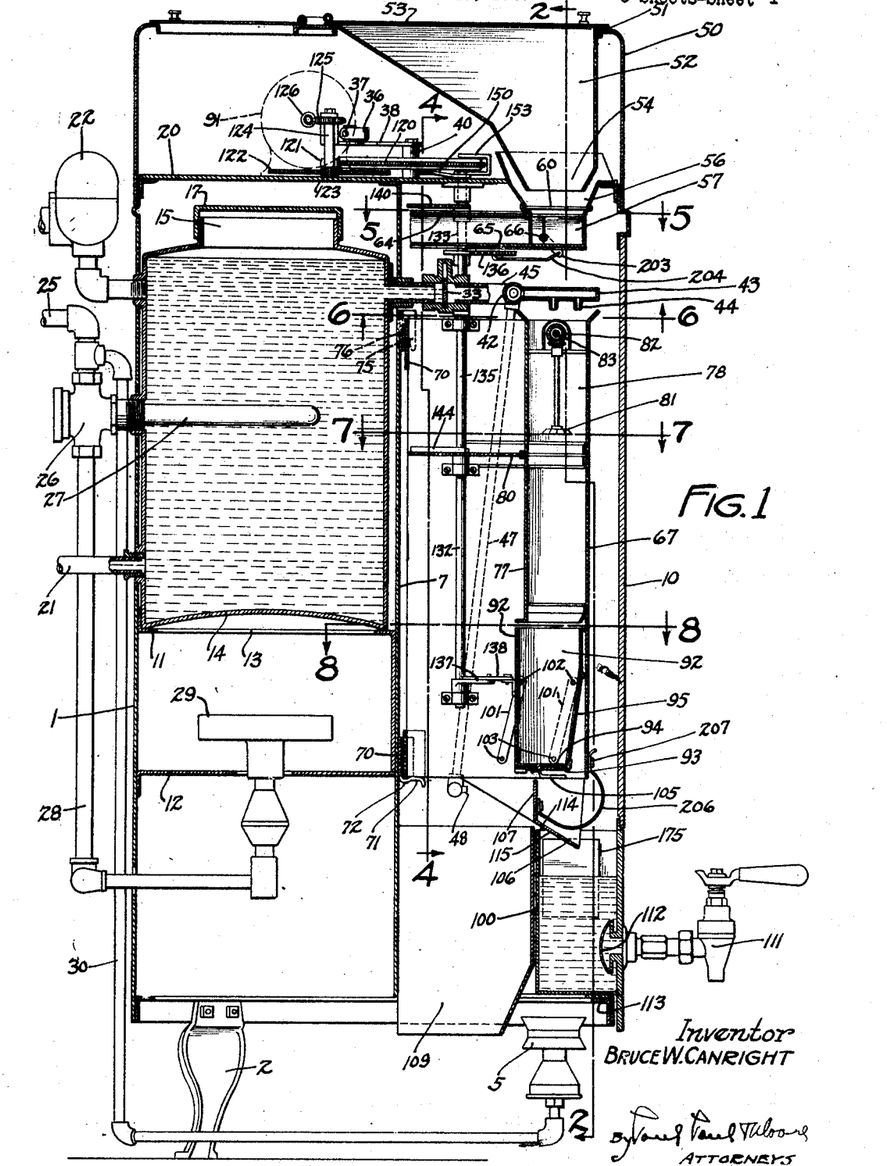
Figure 1 is a vertical section with the elements in draining position.
Figure 6:
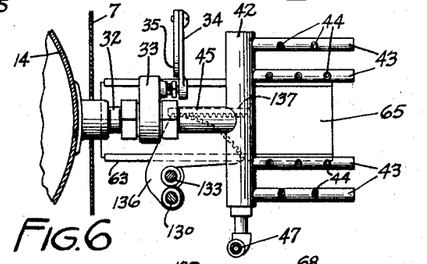
Figure 6 is a plan section on line 6—6 of Figure 1 looking upwardly.
Figure 7:
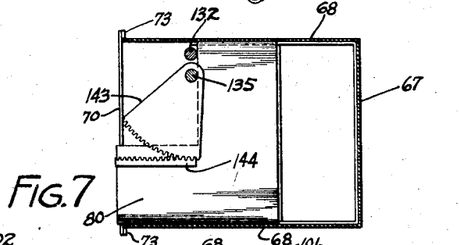
Figure 7 is a plan section on line 7—7.

Means are provided for delivering and heating water, and for this purpose the rear portion of the casing is horizontally partitioned by shelves, respectively as at 11—12, see Figure 1, to enclose the water heater and separate it from the movable portions of the mechanism. The partition 11 has an enlarged opening 13 to permit the application of heat to the bottom of a water receptacle 14. The receptacle is provided with a filling opening 15 closed by a suitable screw cap 17. Access can be had to fill the water receptacle by removal of a lid and shelf 20 held on suitable brackets adjacent the top of the casing 1. This plate also supports certain portions of the timing mechanism as will appear hereafter. A suitable water supply pipe 21 communicates with the water supply chamber and its lower portion, and a pressure relief valve 22 is provided and communicates with the chamber in its upper portion. The gas line is generally indicated at 25 and has therein a valve 26 operated by a thermostat 27, which thermostat is arranged substantially as shown to be in the body of the liquid. The construction of this device forms no part of the present invention and, therefore, is not shown in detail. Connected with and controlled by the valve is a gas supply pipe 28 connected with a burner 29. The pipe 28 passes through the partition 12 and supports the burner between the partitions 11 and 12. A branch gas pipe 30 connects the pipe 25 with the warming burner 5. A delivery pipe 32 connects the top of the tank and projects into the chamber formed by the elements 7 and 8, and at the upper part of this chamber. A valve casing, see Figure 4, connects with this pipe 32 and has a suitable valve 33. In this instance, the valve is of the gate type and is operated by an arm 34 connected by a link 35 with a lever 36, see Figures 9 and 10, mounted at a level above the cover 20, by pivoting as at 37 to a plate 38 which plate also assists in supporting certain portions of the driving and synchronizing mechanism. The plate 38 is supported at the top of a stud 40 which forms a journal for a timing cam gear later to be described. A coil spring 41 surrounding the link 35 tends to throw the link in a direction to close the valve. Extending from the opposite side of the valve, see Figure 6, is a pipe 45 connected with a manifold 42 having extending therefrom a series of pipes 43 each provided with a series of nipples 44. These nipples are arranged to jet water downwardly into the extraction chamber, later to be described. A pipe 47, see Figures 1 and 4, as a branch of the pipe 45, jets hot water through nozzles 48 against a drain screen, in a manner to be described. It will be understood that the hot water is periodically delivered to dry ground coffee to extract certain constituents of the coffee for the purpose set forth, the operation being one of solution, rather than of percolation.

Figure 2:
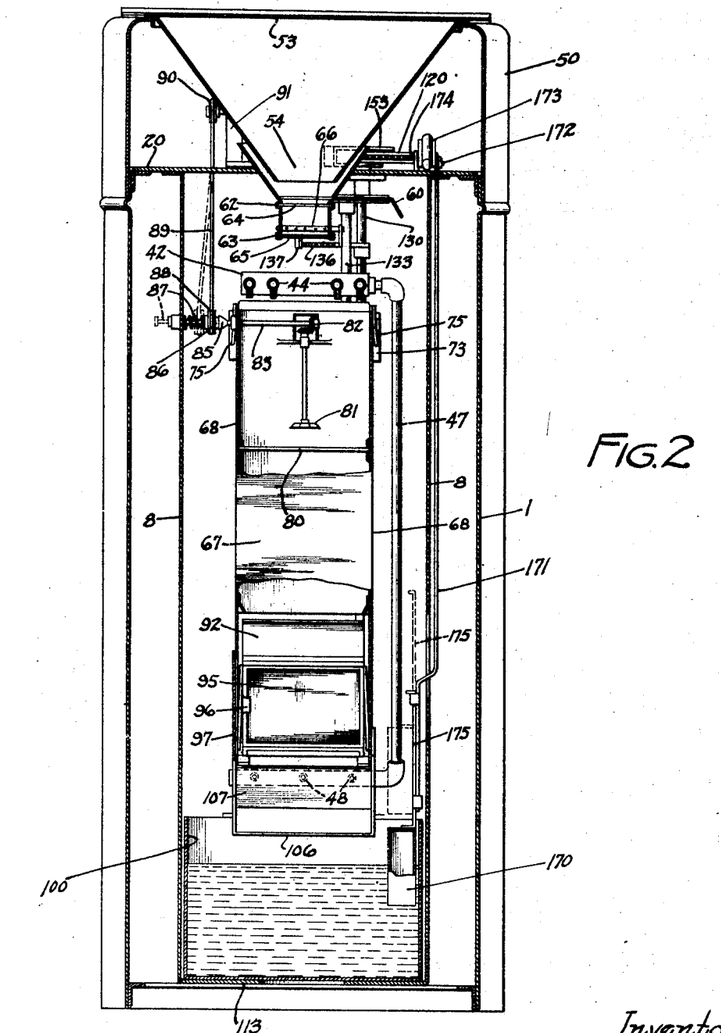
Figure 2 is a section on line 2—2 of Figure 1 looking in direction of the arrow.

The top of the casing 1, see Figure 1, is provided with a separable cap or casing 50, having in its top an opening 51, projecting downwardly through which and into the cap is a dry coffee hopper 52. This hopper is provided with a suitable filling door 53, and its lower end is constricted as at 54 to deliver downwardly into a second hopper 56 which delivers into a measuring chamber 57. A hand operable slide as a valve 60, is interposed between the bottom of the hopper 52 and the measuring chamber 57 so that flow from the hopper may be controlled in this way, as well as automatically, as will appear below. As best shown in Figure 2, the chamber walls are extensions of the walls of the hopper 56, and the walls are formed to provide two pairs of guide-ways respectively indicated at 62—63. In the guides are slides respectively indicated at 64—65, see also Figure 1. The slides constitute valves, and it will be understood that any suitable form of valve may be used. The valve 65 forms a bottom for the measuring chamber, and acts to release the measured charge, while the valve 64 functions to cut off the supply of coffee after the chamber is filled. Therefore the slide 65 is always closed before slide 64 is open, and slide 64 is always closed before slide 65 is opened.

A suitable agitator shaft 66 traverses the chamber 57, and is automatically operable in a manner later to be described. The measuring chamber is arranged at a level above the water delivery pipes, 43, 44, and is so arranged that it drops its charge, see Figure 6, between the innermost series of pipes, which are spaced apart to permit this operation.

Figure 3:
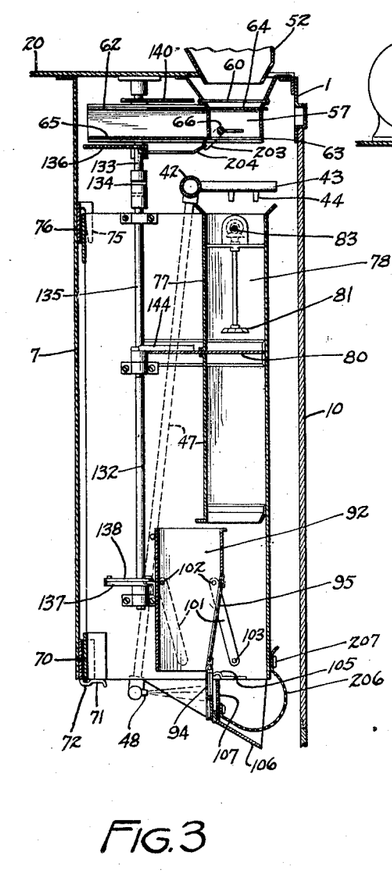
Figure 3 is a fragmentary view of the coffee making portion of the apparatus illustrating the position of the parts during the extraction period.

An important feature of the invention is the provision of means for receiving ground coffee, introducing hot water into a receptacle containing the ground coffee, allowing the water and coffee to remain in contact for a predetermined time, then releasing the coffee, receiving the released coffee in a drain receptacle, holding the coffee in the drain receptacle while the liquid portion is drained off, and then emptying the grounds after this draining operation. Another feature is the arrangement of a portion of this mechanism so that it can be removed for cleaning. Another feature includes the mounting of the parts, and of a certain portion of the mechanism for operating the same so that this much of the apparatus can also be removed. For these purposes, a casing, see Figures 1, 2, 7 and 8, is provided which comprises a front wall 67 and side walls 68, the side walls being connected at the rear, and at top and bottom by cross strips 70. This casing is open at the top and bottom and rests at its lower end by gravity upon an extension 71, see Figure 1, which is provided with an indented portion 72 to prevent such horizontal sliding movement as would release it. The side walls 68 have out-turned portions 73, see Figure 7, and the elements 70 extend beyond the side 68 and engage with and are fastened to these extensions 73. The extensions 73 are engaged with retainers 75, see Figure 1, secured as at 76 to the wall 7. In introducing the casing, its upper rear portion is first brought to a position just beneath the hook-like elements 75 and then the casing is raised to engage elements 73 with elements 75, thereafter the lower portion of the casing is swung inwardly to engage the element 70 with the element 72 as best shown in Figure 1. When the casing is thus placed its outer wall 67 is ordinarly spaced from the door 10 as shown. A partition 77 divides this removable casing vertically to provide an elongated compartment, the upper portion of which constitutes an extraction chamber 78. A slide 80 is arranged as a valve to divide the compartment horizontally and form a bottom for the extraction chamber, and the slide can be moved to form the bottom as shown in Figure 3, or can be withdrawn to release a charge as shown in Figure 1. Any form of valve may be used for this purpose. For example, the form shown in the modification of Figure 14.

Within this extraction chamber a charge of the ground coffee is delivered, and then water is delivered upon the coffee, and all is held until a predetermined amount of solution has taken place, to extract or dissolve a certain portion of the desired soluble constituents of the ground coffee. The extraction chamber is arranged vertically beneath the measuring chamber 57 so that the charge may be dropped from the measuring chamber directly downwardly thereinto. A horizontal agitator 81 is arranged on a vertically disposed shaft, the shaft being supported in any desired manner, and being connected by gear 82 with a horizontal shaft 83, see Figure 2. This shaft 83 extends outwardly through one of the vertical walls 68 and is provided with a hollow cone portion 85. Another cone portion 86 is slidably and rotatably mounted on the shaft 87, and is provided with a pulley 88 connected by a belt 89 with the pulley 90 of motor 91 which drives the synchronizing mechanism. This agitator may, therefore, be considered to be driven by a portion of the synchronizing mechanism. The shaft 87 is slidably mounted so that by drawing it to the position shown in dotted lines in Figure 2 the elements of the clutch may be disengaged to permit removal of the extraction chamber supporting casing.

Figure 13:
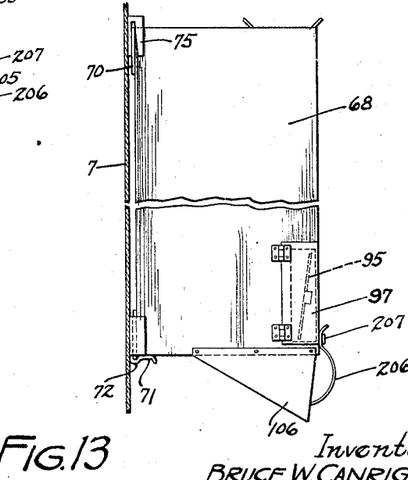
Figure 13 is a detail view illustrating the location of the door giving access for removal of the drain receptacle screens.

Below the lower end of the extraction chamber is disposed a drain receptacle 92. This receptacle is arranged to receive the charge delivered from the extraction chamber, and has a pivoted bottom 93 having a portion perforated as at 94. This perforated bottom may have the form of a screen and preferably has such a form, and the screen portion is removably arranged. As shown, the screen portion 94 can be removed in a lateral direction. The major portion of the outer side of this receptacle is also provided with a removable screen 95 and this screen has the form of a slide detachable by withdrawal laterally, as best shown in Figure 2. The screen is held against accidental displacement by a suitable device indicated at 96. Access for removal of the screen 95 may be had through a door 97, see Figure 13, in one of the side walls 68. A portion of the vertical wall of this receptacle is thus screened to increase the draining area. It will be understood that a charge dropped from the extraction chamber will fall upon the screened portion and the coffee solution will drain into a dispensing receptacle indicated at 100. If desired, a gauze fabric may be arranged to receive and re-strain the solution and again strain it. This second strainer may be supported either by the chute 106 or by the receptacle 100.

Figure 4:
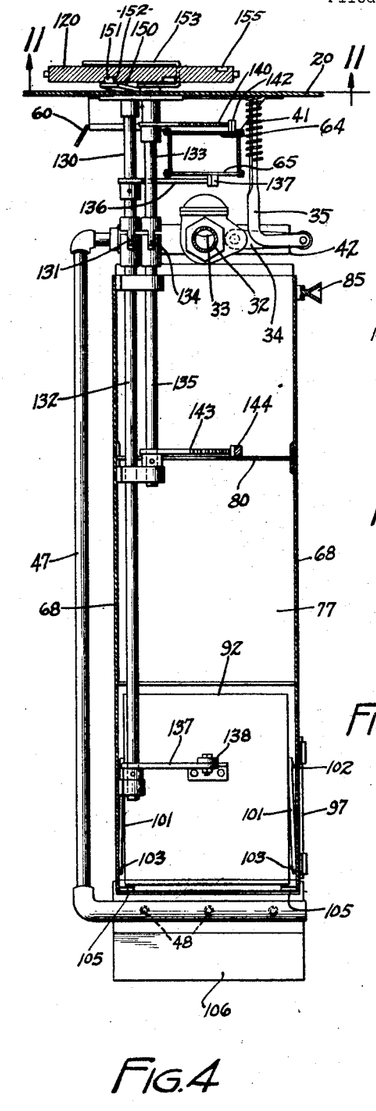
Figure 4 is a section on line 4—4 of Figure 1.
Figure 8:
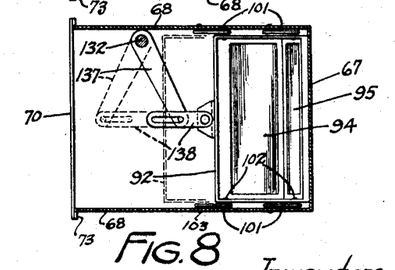
Figure 8 is a plan section on line 8—8.

The drain receptacle is supported to move to a dumping position and this support in this instance comprises two pairs of parallel links 101 a pair at each side, see Figures 3, 4 and 8. One end of each link is connected as at 102, see Figures 1 and 4, to the drain receptacle and the other as at 103, to a corresponding wall 68. The connection is such that the drain receptacle is always supported in a vertical position during movement, or at rest in either of its adjusted positions. The hinged or movable bottom of the drain receptacle is supported in closed position by means indicated at 105. The arrangement is such that the bottom slides upon the element 105. Moreover, the arrangement is such that as the receptacle moves from this charge receiving position the bottom is released and falls by gravity to deliver the drained grounds to a point outside the machine. This release takes place as the receptacle moves to dumping position. The dumping position is shown in Figure 3, where it will be also noted that when in this position hot water plays upon the bottom screen to remove the coffee grounds. In order that the liquid may only be delivered to the dispensing chamber a spout 106 is provided which has a vertical partitioning portion 107, the top edge of which lies just beneath the swinging bottom, see Figure 1. It will be noted that the screen 94 of the swinging bottom lies vertically above the spout 106 and entirely on that side, so that no liquid can be delivered on the left hand side of the partition 107. In dumping, the receptacle is moved to the left, and at the limit of movement the door is disposed as shown in Figure 3, at the left of the partition 107, so that it empties into a chute 109 leading to a point below and outside of the main casing 1. A suitable pan can be provided for receiving the grounds. Such a pan has not been shown. It is a feature of this invention to automatically deliver the grounds at a point visible to the operator so that undue accumulation may not be allowed to take place and so that such accumulation is prevented within the machine. The spout 106 delivers into the coffee dispensing chamber 100 which is provided with any preferred form of cock 111, the entrance to the cock being guarded by screen 112. This receptacle 100 may be removed. Its bottom rests upon the shelf-like bottom portion 113 of the casing 1, and its accidental outward movement is prevented by engagement of its upper edge 114 with the under surface of the slanting portion 115 of the spout 106. In disposing the dispensing receptacle in the position shown, the upper end is first introduced beneath the spout 106 and then the lower end is swung inwardly to the position shown. It will be seen that the lower portion of the door 10 also overlaps the upper outer wall of the receptacle 100 to further assist in securing it in operative position.

Means is provided and is connected to operate the valves and the drain receptacle to move them in timed relation respectively to close the measuring chamber valve, bring the drain chamber to charge-receiving position, open the hopper and extraction chamber valves and then cause a dwell of these elements in a respective position for a predetermined time, and afterwards close the extraction chamber and hopper valves, open the measuring chamber valve, open the hot water valve, move the drain receptacle to dumping position, and then cause a dwell of the elements in respective positions for a timed period. The following mechanism is described for the above purposes, and the details of construction are claimed, as well as the broad idea of arrangement, and operation of the elements.

Figures 9, 10, 12:
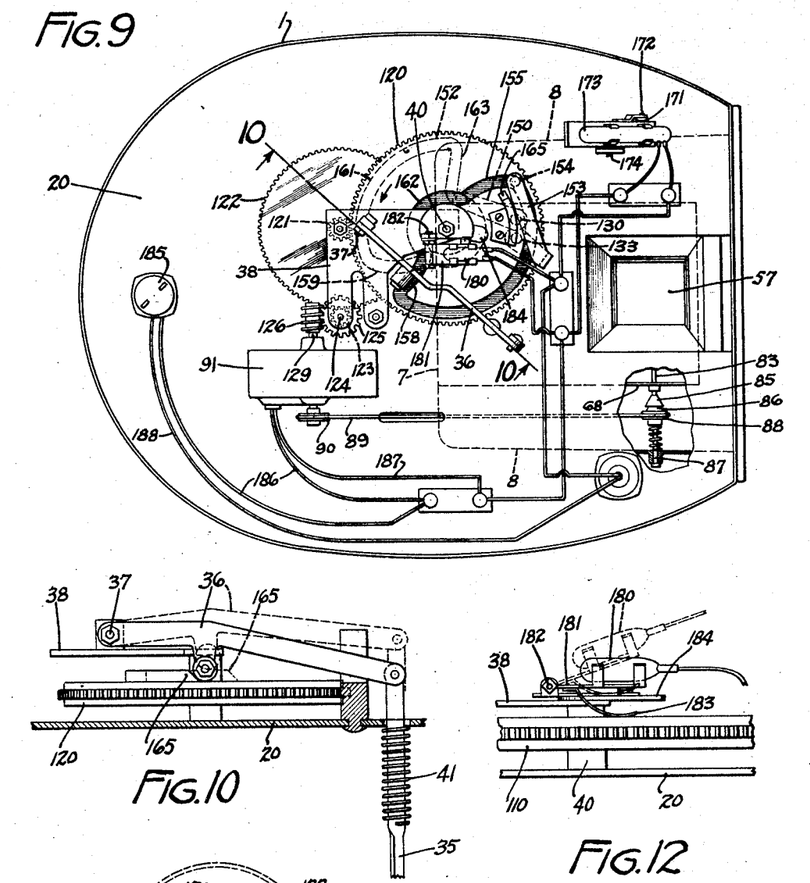
Figure 9 is a top plan view showing the synchronizing and driving mechanism and electrical control therefor.
Figure 10 is a vertical section on line 10—10 of Figure 9 illustrating the trip for operating the water valve.
Figure 12 is a detail view illustrating the mounting and operation of one of the mercury switches.
Figure 11:
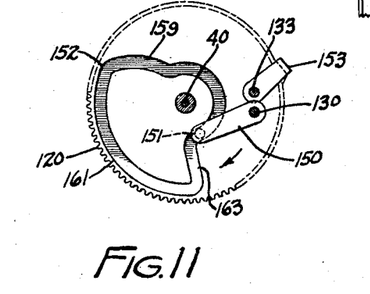
Figure 11 is a reverse plan view of the timing cam.

A portion of the driving and synchronizing mechanism is mounted upon the cover 20, see Figures 1 and 9. A cam gear 120 is mounted for rotation upon the stud 40. This gear is in mesh with a pinion 121 rotating upon a suitable shaft and secured to a larger gear 122. This larger gear meshes with a small gear 123 which is secured to a shaft rotatably supported at its lower end in the plate 20 and its upper end in the plate 38. At the upper end of this shaft 124 is a worm gear 125 meshing with a companion worm 126 of a motor shaft 129. The train of gears are convenient means for driving the cam gear 120. The cam gear is provided on each face, upper and lower, with an irregular cam groove. The grooves are so related as to obtain independent rotative movements of each of a pair of shafts. The arrangement of these shafts is most clearly shown in Figure 4. They are coupled with corresponding shafts carried by the removable frame or casing which supports the extraction chamber and drain receptacle. Shaft 130 is suitably journaled and is connected by clutch 131 with shaft 132. Shaft 133 is suitably journaled and connected by clutch 134 with shaft 135. Both shafts 130 and 133 are short shafts and may be considered stub shafts. The clutch connection is such that when the clutches assume the position shown in Figure 4, the supporting casing for the extraction chamber and drain receptacle can be removed as before mentioned. Therefore, when it is desired to remove this casing the clutches are arranged as shown in Figure 4. This can be conveniently accomplished in a manner to be described. The shaft 130 carries sector 136 which is in mesh with a rack 137 carried by the measuring chamber slide or valve 65. The shaft 132, which is an extension of shaft 130, has an arm 137 having a slot and pin connection, see Figure 8, with link 138 pivoted to the drain receptacle 92. The link connection is for the purpose of providing lost motion so that the translative movement of the drain receptacle is less than the swinging movement of the sector 136, or arm 137. This method prevents engagement of the receptacle with the shaft 132 when the receptacle 93 is brought to a position shown in Figure 3.

The shaft 133 has a sector 140 meshing with a rack 142 of the slide or valve 64. The shaft 135 as a continuation of the shaft 133, has a sector 143 in mesh with a rack 144 of the slide or valve 80. The shaft 130 has an arm 150 at its upper end which has a projection 151 engaged with the lower groove 152 of the cam gear. The shaft 133 has an arm 153 which has a projection 154 engaged in the groove 155 on the upper side of the cam gear. The gear is, in this instance, rotated in direction of the arrow and its position in Figure 9 corresponds to the position of the valves and drain receptacle shown in Figure 1 in which valve 80 has just been opened, and the draining period just begun.

Beginning with the cam gear in the position shown in Figure 9, it will be seen that if it moves in a counter-clockwise direction, the upper groove 155 and the lower groove 152 will hold their respective levers in the same position that they now occupy, in this instance for about ninety seconds which is the draining period. Next, the portion 158 of the upper cam engages and moves the lever 153 in counter-clockwise direction to first cause the shafts 133—135 to close their valves or in other words, close the hopper valve 64 and the extraction chamber valve 80. Substantially immediately after closure of these valves, cam 165 raises lever 36, and opens valve 33, to supply boiling water. It will be understood that the valve 33 will remain open for a period sufficient to supply the proper amount of boiling water. The arrangement is such that the water valve is open for a fraction of the extraction period, and at the beginning of that period and after delivering of the charge. Therefore, it is only during a portion of the time that the levers are held motionless by grooves 161—162 that the water is delivered. The reason for this step is that the water must remain in contact with the coffee for a sufficient length of time to obtain the proper extraction. Closely following the above operations, portion 159 of the lower groove now throws its arm 150 outwardly to cause shafts 130—132 to rotate and open the measuring chamber valve 65, and draw the drain receptacle to dumping position. Portion 162 of the upper groove and portion 161 of the lower groove now act, over a period of about ninety seconds, to hold the elements in their position during which extraction takes place, the grounds are dumped and the screens of the dumping receptacle cleaned. At the end of this ninety second period the portion 163 of the lower groove draws its arm inwardly, rotates shafts 130—132 to close the measuring valve 64 and bring the drain chamber to receiving position. As the movement of the gear continues arm 153 is thrown in clockwise direction to operate shafts 133—135 and bring the parts again to the position shown in Figure 1.

The sequence of valve opening and closing may be and preferably is as follows: Close measuring chamber valve; open hopper valve to deposit a charge in the measuring chamber; bring drain receptacle to receiving position (any time after dumping period and before opening of the extraction chamber valve); open extraction chamber valve; cause elements to dwell in their respective positions for sufficient time to allow draining of the coffee solution. In the next cycle. Close extraction chamber valve (any time after dumping and before the next opening of the measuring chamber valve); close hopper valve; open measuring chamber valve; supply water during a fraction of the period in which the charge is held in the extraction chamber and at the beginning of that period after delivery of the charge; bring drain to dumping position; allow elements to dwell in their respective positions for a period sufficient to obtain proper extraction or solution of the coffee in hot or boiling water or solvent.

Means is provided for stopping operation of the coffee making mechanism when the dispensing receptacle is full. This means includes a float 170, see Figure 2, supported by a link 171 in turn pivoted as at 172 to a mercury switch 173 pivoted as at 174 to rock. See also Figure 9. The float 170 is adjustably attached to the element 171, and for this purpose has an extension 175 connected to slide against the lower portion of the link 171. By this arrangement the float can be raised to the position shown in dotted lines in Figure 2 to permit removal of the dispensing receptacle 100. The mercury switch is for the purpose of controlling the electrical circuit which operates the motor 91, and is connected in a shunt circuit to permit operation of the motor at all times, when the dispensing receptacle 100 is not full. The float, when it reaches its upper limit, causes tipping of the switch and the mercury moves to the opposite end and contact is broken. Pivotally mounted upon the plate 38 is a second mercury switch 180. This switch is mounted upon a plate 181 which is pivoted as at 182 to the plate 38. The mounting has an extension 183. This extension is engageable by a projection 184, see Figure 9, carried by the cam gear. When this extension engages the extension 183, the mercury switch is tipped to and held in the position shown in dotted lines in Figure 12, and the circuit to the motor is broken. The arrangement of the support of the mercury switches within the circuit is shown in Figure 9. A suitable snap switch is shown at 185. Current from the switch connects through wire 186 with one side of the motor and the other side of the motor is connected by wire 187 both with one contact with the mercury switch 173 and with one contact of the mercury switch 180. The opposite side of the switch 185 is connected by wire 188 with the opposite terminals of both switches 173 and 180. When the switches are positioned as shown in full lines in the figures, the current of the switch 173 is in control. When, however, switch 173 is (due to a full dispensing tank) moved to position to open its contact, switch 180 assumes control, and as soon as the trip 184 tips the switch to the position shown in dotted lines in Figure 12, circuit is broken to the motor 91 and the coffee making and timing mechanism ceases to operate. It may be assumed that the float is now about to cause a tipping motion of the switch 173 since the liquid has risen and is now acting on the float for this purpose. It will be noted that the connection with the switch limits its downward movement at substantially the position shown in full lines. When coffee is withdrawn from the receptacle 100, the float drops, switch 173 again assumes the position of Figure 9, and the motor starts.

Figure 14:
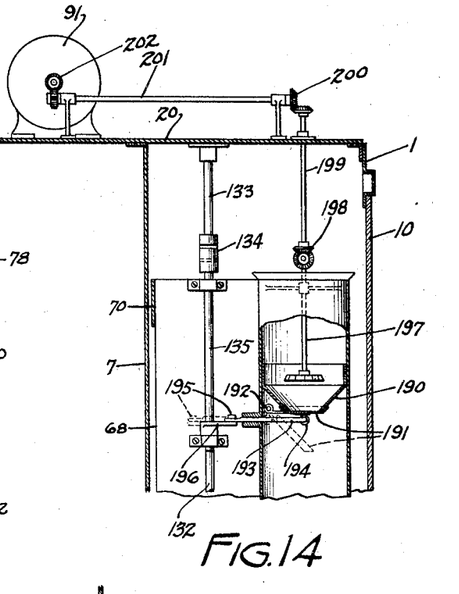
Figure 14 is a fragmentary view illustrating a modified form of valve and valve-operating mechanism for the extraction chamber.

In Figure 14, a modified form of valve has been shown. In this instance, the extraction chamber has a chute-like bottom 190, the lower surface of which forms a seat for a valve or closure element 191, pivoted as at 192 to swing downwardly, as shown in dotted lines. The swingable element 191 is held in closed position by means of a slide 193 having a roller 194 engageable with the under surface of the valve 191. The element 193 is pivotally connected as at 195 to an arm 196 carried by shaft 135. A modification of the stirring apparatus is also shown. In this instance the vertical shaft 197 extends above the extraction chamber, and is connected by beveled gearing 198 with shaft 199 which shaft, in turn, is connected by gearing 200 to shaft 201, in turn connected by gearing 202 with the motor 91.

Figure 5:
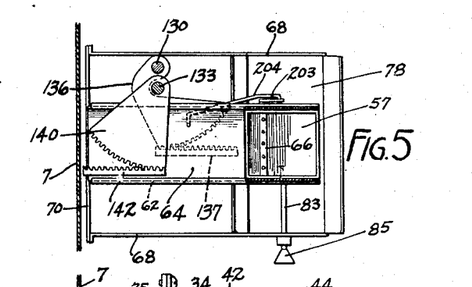
Figure 5 is a plan section on line 5—5 of Figure 1.

By reference to Figure 1, it will be seen that the agitator 66 has an arm 203 connected by link 204 with the gear segment 136. See also Figure 5. Thus the agitator is operated, for each movement of the valve.

A fabric strainer is shown at 206 in Figure 1, so arranged that the liquid coffee passes therethrough after passage through the screen 94 of the drain chamber. This screen has one end detachably secured as at 207 to the casing which supports the extraction and drain chambers so that the screen 206 may be straightened out for cleaning. This auxiliary strainer member 206 is particularly desirable when finely ground coffee is used.

I claim as my invention:

1. An apparatus for making coffee comprising a ground-coffee supply hopper having a valve for controlling discharge therefrom, a charge measuring chamber arranged to receive dry coffee from the hopper and having a discharge control valve, an extraction chamber arranged to receive a charge released from the measuring chamber and having a valve to control discharge therefrom, means for delivering hot water within the extraction chamber including a valve, a drain receptacle arranged to receive a charge delivered from the extraction chamber and having a pivoted perforated bottom as a drain, said drain receptacle being supported to move to a dumping position, means for holding the bottom in closed position when the drain receptacle is in charge-receiving position, and arranged to release the bottom as the receptacle moves to dumping position, and means connected to operate the valves and drain receptacle in timed relation to close the measuring chamber valve, bring the drain chamber to charge-receiving position, open the hopper and extraction chamber valves and then cause a dwell of these elements in respective positions for a predetermined time, and afterwards close the extraction chamber and hopper valves, open the measuring chamber valve, open the hot water valve, move the drain receptacle to dumping position, and then cause a dwell of these elements for a timed period, the arrangement being such that the timing mechanism opens the water valve for a fraction of the period in which the charge is held in the extraction chamber and at the beginning of that period and after delivery of the charge.

2. An apparatus for making coffee comprising a ground coffee supply hopper having a valve for controlling discharge therefrom, a charge-measuring chamber arranged to receive dry coffee from the hopper and having a discharge control valve, an extraction chamber arranged to receive a charge released from the measuring chamber and having a valve to control discharge therefrom, means for delivering hot water within the extraction chamber including a valve, a drain receptacle arranged to receive a charge delivered from the extraction chamber and having a swingable element as a drain, said drain receptacle being supported to move to a dumping position, means for holding the swingable element in closed position when the drain receptacle is in charge-receiving position, and arranged to release it as the receptacle moves to dumping position, and means connected to operate the valves and drain receptacle in timed relation to close the measuring chamber valve, bring the drain chamber to charge receiving position, open the hopper and extraction chamber valves and then cause a dwell of these elements in respective positions for a predetermined time, and afterwards close the extraction chamber and hopper valves, open the measuring chamber valve, open the hot water valve, move the drain receptacle to dumping position, and then cause a dwell of these elements for a timed period, the arrangement being such that the timing mechanism opens the water valve for a fraction of the period in which the charge is held in the extraction chamber and at the beginning of that period and after delivery of the charge.

3. An apparatus for making coffee comprising a ground coffee supply hopper having a valve for controlling discharge therefrom, a charge-measuring chamber arranged to receive dry coffee from the hopper and having a discharge control valve, an extraction chamber arranged to receive a charge released from the measuring chamber and having a valve to control discharge therefrom, means for delivering hot water within the extraction chamber including a valve, a drain receptacle arranged to receive a charge delivered from the extraction chamber, and having a perforated portion as a drain, and means connected to operate the valves in timed relation to close the measuring chamber valve, open the hopper and extraction chamber valves and then cause a dwell of these elements in respective positions for a predetermined time, and afterwards close the extraction chamber and hopper valves, open the measuring chamber valve, open the hot water valve, and then cause a dwell of respective elements for timed periods.

4. An apparatus for making coffee comprising a ground coffee supply hopper, a charge measuring chamber arranged to receive dry coffee from the hopper, an extraction chamber arranged to receive a charge released from the measuring chamber, means for delivering hot water within the extraction chamber, a drain receptacle arranged to receive a charge delivered from the extraction chamber, and adapted to dump and supported to move to a dumping position, and means including valves to cause a charge of dry coffee to be delivered into the extraction chamber along with hot water, and to hold the water and coffee in contact for a predetermined length of time, and then to release the charge into the drain receptacle, and afterwards to move the drain receptacle to dumping position and cause the same to dwell in that position for a predetermined time.

5. An apparatus for making coffee comprising a support, upon which are mounted, a ground-coffee supply device, a charge-measuring device arranged to receive dry coffee from the supply device, an extraction device arranged to receive a charge released by the measuring device, means for delivering hot water to coffee within the extraction device, a drain device arranged to receive a charge delivered from the extraction device, said extraction and drain devices having a common mounting detachably secured to the support, and means for operating the mechanism to measure a charge of coffee and deliver it to the extraction device, to introduce a charge of water after deposit of the charge of coffee in the extraction chamber, to cause the coffee and water to remain together for a predetermined length of time, to release the charge and cause it to be delivered to the drain receptacle, and to cause the drain receptacle to drain a predetermined time then move to dumping position, a portion of said mechanism being mounted upon the common mounting.

6. An apparatus for making coffee comprising a support upon which are mounted, a ground-coffee supply device, a charge-measuring device arranged to receive dry coffee from the supply device, an extraction device arranged to receive a charge released from the measuring device, means for delivering hot water to coffee within the extraction device, a drain device arranged to receive a charge delivered from the extraction device, said extraction and drain devices having a common mounting detachably secured to the support, and means for operating the mechanism to make coffee, and dispose of made coffee and grounds, a portion of said mechanism being mounted upon the common mounting.

7. A coffee making apparatus comprising a casing upon which is supported a coffee making mechanism including a motor, motor circuit and switch for the circuit, a coffee reservoir removably arranged upon the support, a float within the reservoir, a link operatively connected to the switch, connections between the link and float permitting the float to be moved out of the reservoir independently of movement of link and therefore without operation of the switch, the connection being such that when the float is in operative position, and is moved by the liquid, the switch is moved to another circuit control position.

8. A device of the class described including a casing, a support detachably secured to the casing, a coffee making apparatus in part supported upon the casing and in part mounted upon the support, that part upon the support including an extraction chamber, and a drain chamber below said extraction chamber and arranged to move from beneath said chamber to a dumping position and adapted to dump, mechanism upon the support for operating the coffee making mechanism, means upon the casing for delivering water and coffee into the extraction chamber, and mechanism for operating the delivering means in synchronism with the coffee making means, the mechanism of the support being detachably connected with the last mentioned means to permit removal of the support.

9. A device of the class described including a casing having an upright door, a support detachably secured to the casing to be removed through the door, a coffee making apparatus in part supported upon the casing and in part mounted upon the support, that part upon the support including an extraction chamber, and a drain chamber below said extraction chamber arranged to move from beneath said chamber to a dumping position and adapted to dump, mechanism upon the support for operating the coffee making mechanism, means upon the casing for delivering water and coffee into the extraction chamber, and mechanism for operating the delivering means in synchronism with the coffee making means, the mechanism of the support being detachably connected with the last mentioned means to permit removal of the support.

10. A device of the class described including a casing having a removable cover, a shelf within the casing bridged by the cover, and having an opening in the top, a hopper extending through the opening and within the cover, and detachably resting upon the cover, a second hopper arranged in the shelf to receive material from the first hopper, and a coffee making mechanism arranged within the casing and aligned to receive material delivered by the hoppers.

11. A device of the class described including a casing having a removable cover, a shelf within the casing bridged by the cover, and having an opening in the top, a hopper extending through the opening and within the cover, and detachably resting upon the cover, a second hopper arranged in the shelf to receive material from the first hopper, a coffee making mechanism arranged within the casing and aligned to receive material delivered by the hoppers, and mechanism mounted upon the shelf and connected to operate the coffee making mechanism, the said covering having an opening permitting access to mechanism at a point laterally of the hopper.

12. A device of the class described comprising a structure providing an extraction chamber, a valve for controlling exit therefrom, a drain chamber arranged to receive a charge released from the extraction chamber, means for closing the extraction chamber valve, means for delivering a measured charge of coffee and hot water into the chamber, holding the charge in the chamber a predetermined length of time, releasing the charge to be received by the drain chamber, and allowing the released charge to remain in the drain chamber a predetermined length of time.

13. A device of the class described comprising a structure providing, an extraction chamber, a valve for controlling exit therefrom, a drain chamber arranged to receive a charge released from the extraction chamber, and means for closing the extraction chamber valve, means for delivering a measured charge of coffee and hot water into the chamber, holding the charge in the chamber a predetermined length of time, releasing the charge to be received by the drain chamber, allowing the released charge to remain in the drain chamber a predetermined length of time, said mechanism including a support removably attached to the structure, and upon which support said extraction chamber and drain chamber are carried.

In witness whereof, I have hereunto set my hand this 16th day of December, 1927.

BRUCE W. CANRIGHT.